INVENTORS
HAROLD ESTEN
WARREN E. JAMISON

ATTORNEY

Sept. 29, 1964     H. ESTEN ETAL     3,150,901
BEARING SURFACES

Filed Nov. 17, 1961                              2 Sheets-Sheet 2

INVENTORS.
HAROLD ESTEN
WARREN E. JAMISON
BY

ATTORNEY

United States Patent Office 3,150,901
Patented Sept. 29, 1964

3,150,901
BEARING SURFACES
Harold Esten, West Chester, Pa., and Warren Elliot Jamison, New Milford, Conn., assignors to General Electric Company, a corporation of New York
Filed Nov. 17, 1961, Ser. No. 153,042
8 Claims. (Cl. 308—241)

This invention relates generally to the reduction of friction on bearing surfaces and more particularly to a bearing surface and method for preparing it.

A bearing surface is defined here to mean the surface of an object upon which another object revolves, slides, etc.

The efficacy of a lubricant as a friction reducing expedient is well known; however, for certain applications the usual oils and greases are not suitable. It appears that in an evacuated environment such as found in space, X-ray tubes, etc., most, if not all, petroleum type lubricants rapidly evaporate. Without lubrication, friction is higher, requiring greater energy inputs and generally causing rapid wearing of the bearing surfaces. Much research is therefore being undertaken to find new materials and/or lubricants which will permit the operation of moving parts for prolonged periods in an evacuated environment. In addition it is desirable that the friction between bearing surfaces be as small as possible so that the energy required for such operation will be minimized.

It is therefore an object of this invention to provide a bearing surface which will reduce friction in an evacuated environment.

It is also an object of this invention to provide a method for preparing such a bearing surface.

In carrying out the invention in one form, which may be preferred, a particular liquid metal alloy is applied to the bearing surface. The surface may then be wiped free of any liquid remaining, leaving only what might be called a "dry film" of the alloy. This dry film produces a marked decrease in the friction between the surface so treated and the other bearing surface in contact with it. The other bearing surface may also be treated in the same manner.

The invention will be better understood from the following description taken in connection with the accompanying drawings in which.

When two liquid metals are mixed together and made to freeze, it will be found that the temperature at which they begin to freeze depends upon the relative proportions of the metals in the mixture. For certain combinations of two metals it will also be found that there is one particular proportion or alloy which will freeze at the lowest temperature. This composition is known as the eutectic alloy, and the eutectic temperature, or temperature at which the eutectic alloy freezes, is found to be lower than the temperature at which either of the metals freezes if it is pure.

Figure 1:
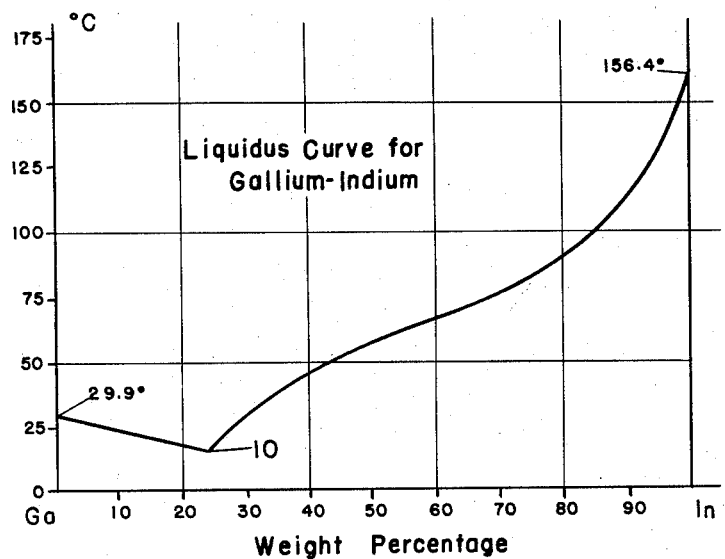
FIGURE 1 is a diagram of the liquidus curve for the gallium-indium alloy system.

Referring to FIGURE 1, a diagram of the freezing temperatures of all gallium and indium mixtures is shown. The curve indicated is known as the liquidus curve, since it represents the demarcation between liquid metals (above the curve) and frozen metals (below the liquidus curve). The left ordinate of this diagram represents pure gallium, with the percentage of indium added increasing to the right until the right ordinate is reached, which represents pure indium. At point 10, the lowest point on the liquidus curve, the temperature is 15.7° C. and the composition is 76% gallium and 24% indium. This alloy is the eutectic alloy for the gallium-indium system, and this temperature, which is equivalent to 60.3° in the Fahrenheit system, is seen to be below the usual room temperature, which means that the alloy can easily be maintained in liquid form.

In accordance with the invention, the balls of an antifriction bearing are coated with the eutectic composition or alloy of gallium and indium. The races of the bearing may also be coated with this alloy. For some purposes it may be found desirable to remove most of this eutectic alloy leaving only what might be termed a "dry film."

Preparation of the bearing surfaces, in accordance with the invention, can be accomplished by dipping the surface in the liquid alloy and then removing any excess alloy by shaking or wiping the surface.

Figure 2:
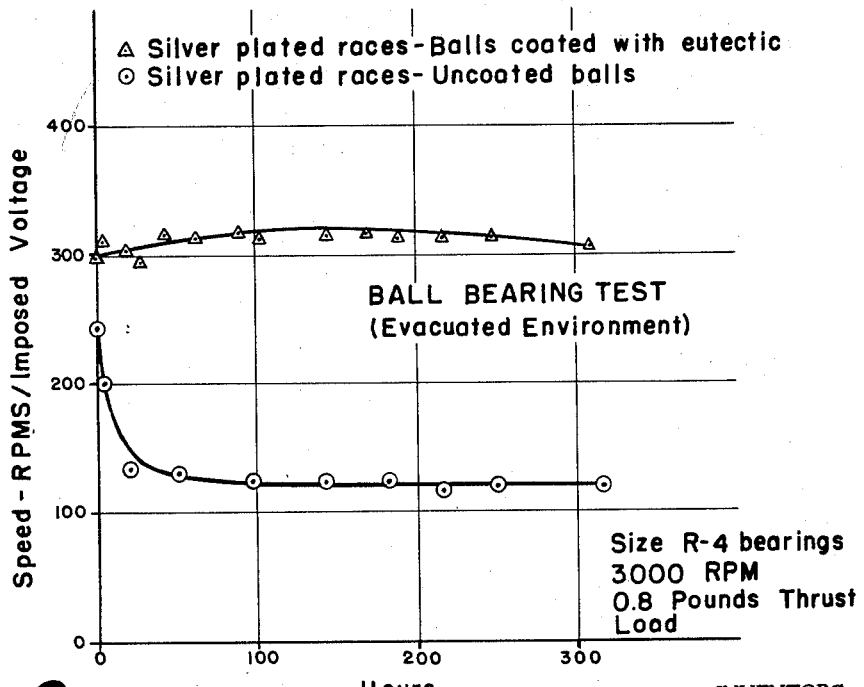
FIGURE 2 is a plot of the results of a test performed using the invention.

Since a primary object of this invention is to provide a bearing surface which will reduce friction in an evacuated environment, a test was run in a chamber with a vacuum of at least $1 \times 10^{-4}$ mm. Hg. A silver plated race was used with the steel balls coated with the gallium-indium eutectic alloy, and, for comparison, a silver plated race with uncoated steel balls was run under the same conditions. After a run-in period of from 16 to 20 hours at 1800 r.p.m., the bearings were run at about 3000 r.p.m. A plot was made having as its ordinate, the speed at which the bearings were run divided by the voltage which had to be applied to the driving motor to achieve this speed, and as its abscissa, the elapsed time in hours. This plot has been reproduced as FIGURE 2. It can be seen that after an initial period when the results varied, both bearings had a fairly constant torque. It is also evident that the bearing having the balls coated with the eutectic alloy had much lower friction than that with the uncoated balls. At the completion of the test the uncoated ball bearing coasted to a stop from 3200 r.p.m. in 111 seconds, while a coasting time, from 3000 r.p.m. to a stop, of 426 seconds was recorded for the coated ball bearing—a further indication of the efficacy of this invention. The expense and time involved in making a life test precluded running the bearings until they were destroyed.

It appears that one condition which must be met in order to achieve the advantages of this invention is that the bearing surface to which the eutectic alloy is applied must be "wet" by the alloy. Although a definitive conclusion as to the mechanism which occurs in this wetting has not been achieved, it appears that some type of alloying with the bearing surface material results. Suitable wetting has been found to occur with copper, steel and silver, although it is believed that other elements and compounds may be equally well wet by this eutectic alloy.

In addition to the eutectic alloy of gallium and indium, the ternary eutectic of gallium, indium and tin has been investigated. This ternary eutectic has a composition by weight of 62.5% gallium, 21.5% indium and 16% tin. The eutectic temperature is 10.7° C., which is somewhat lower than for the binary gallium and indium eutectic. The gallium, indium and tin eutectic alloy has advantages similar to those described for the gallium and indium eutectic.

In addition to the testing of antifriction type bearings, heretofore described, sliding friction has also been tested under evacuated conditions with satisfactory results.

Figure 3:
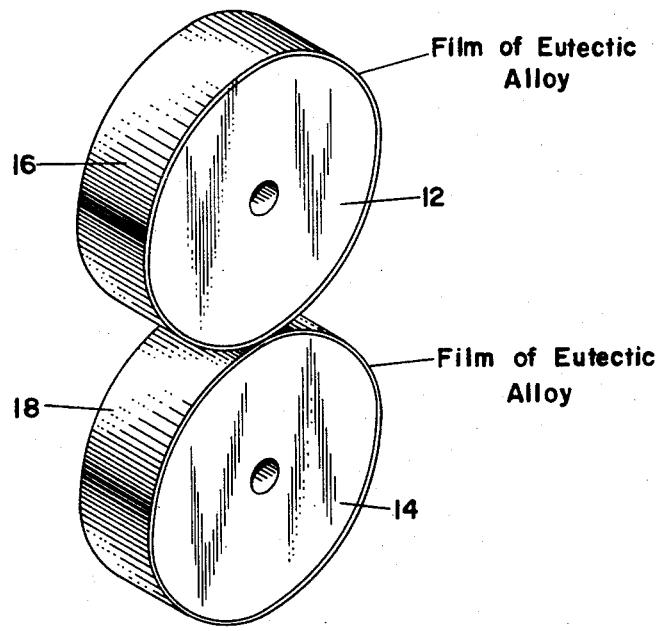
FIGURE 3 is a schematic isometric of two cylinders having bearing surfaces in accordance with the invention.

Referring to FIGURE 3, cylinders 12 and 14 are shown having bearing surfaces 16 and 18 respectively with a film of eutectic alloy according to the invention. As cylinders 12 and 14 rotate, rolling friction occurs between them. The magnitude of this friction is reduced due to the film of eutectic alloy.

While the efficacy of this invention has been particularly described with relation to its application to an antifriction type bearing, it will be obvious that its use for any bearing surface can be made without departing from the spirit of the invention and the scope of the appended claims.

What is claimed as new and desired to be secured by Letters Patent of the United States is:

1. A method of lowering the friction experienced by a bearing surface comprising:
    applying to said bearing surface a material selected from the group consisting of:
        the eutectic alloy of gallium and indium, and
        the eutectic alloy of gallium, indium, and tin.

2. A method of lowering the friction experienced by a bearing surface comprising:
    applying to said bearing surface a material selected from the group consisting of:
        the eutectic alloy of gallium and indium, and
        the eutectic alloy of gallium, indium, and tin; and
        removing any excess of the material applied so that only a dry film of the material remains.

3. A method of lowering the friction experienced by a bearing surface comprising
    applying to said bearing surface the eutectic alloy of gallium and indium.

4. A method of lowering the friction experienced by a bearing surface comprising
    applying to said bearing surface the eutectic alloy of gallium, indium and tin.

5. An object having a bearing surface at least intermittently experiencing a frictional contact,
    said bearing surface having a film of a material selected from the group consisting of:
        the eutectic alloy of gallium and indium, and
        the eutectic alloy of gallium, indium and tin.

6. An object having a bearing surface at least intermittently experiencing a frictional contact,
    said bearing surface having a film of the eutectic alloy of gallium and indium.

7. An object having a bearing surface at least intermittently experiencing a frictional contact,
    said bearing surface having a film of the eutectic alloy of gallium, indium and tin.

8. A first object having a bearing surface;
    a second object having a bearing surface;
    said first and second objects so operatively related that their respective bearing surfaces are at least intermittently in contact, and
    at least one of said bearing surfaces having a film of a material selected from the group consisting of:
        the eutectic alloy of gallium and indium, and
        the eutectic alloy of gallium, indium and tin.

References Cited in the file of this patent

UNITED STATES PATENTS

| | | |
|---|---|---|
| 2,242,101 | Atlee | May 13, 1941 |
| 2,288,655 | Smart | July 7, 1942 |
| 2,649,368 | Smith et al. | Aug. 18, 1953 |

OTHER REFERENCES

"Constitution of the System Gallium-Indium," by Denney et al., Journal of Metals, January 1952, pages 41 and 42.